(12) United States Patent
Savinov et al.

(10) Patent No.: US 8,016,981 B2
(45) Date of Patent: Sep. 13, 2011

(54) METHOD AND APPARATUS FOR PURIFYING AND SEPARATING A HEAVY COMPONENT CONCENTRATE ALONG WITH OBTAINING LIGHT GAS ISOTOPES

(76) Inventors: Mikhail Jurievich Savinov, Moscow (RU); Mikhail Jurievich Kolpakov, Murom (RU)

( * ) Notice: Subject to any disclaimer, the term of this patent is extended or adjusted under 35 U.S.C. 154(b) by 387 days.

(21) Appl. No.: 12/309,931

(22) PCT Filed: Mar. 21, 2007

(86) PCT No.: PCT/RU2007/000139
§ 371 (c)(1), (2), (4) Date: Feb. 3, 2009

(87) PCT Pub. No.: WO2008/018814
PCT Pub. Date: Feb. 14, 2008

(65) Prior Publication Data
US 2009/0257937 A1 Oct. 15, 2009

(30) Foreign Application Priority Data
Aug. 4, 2006 (RU) .................. 2006128430

(51) Int. Cl.
*F25J 3/08* (2006.01)
*C01B 23/00* (2006.01)
(52) U.S. Cl. ............ 203/71; 202/154; 202/155; 62/617; 62/925
(58) Field of Classification Search .................. 423/262; 95/149; 96/243; 210/748.1; 422/186.3; 62/600, 617, 644, 648, 925; 202/153–158; 203/71; 976/DIG. 381
See application file for complete search history.

(56) References Cited

U.S. PATENT DOCUMENTS

| | | | | |
|---|---|---|---|---|
| 2,040,116 A | * | 5/1936 | Schlitt et al. | 62/648 |
| 4,078,907 A | * | 3/1978 | Schlea | 95/173 |
| 4,270,938 A | * | 6/1981 | Schmidt et al. | 62/600 |
| 4,574,006 A | * | 3/1986 | Cheung | 62/648 |
| 5,122,173 A | * | 6/1992 | Agrawal et al. | 62/648 |
| 7,516,627 B2 | * | 4/2009 | Savinov | 62/644 |
| 7,922,875 B2 | * | 4/2011 | Kambe et al. | 203/5 |
| 2009/0188278 A1 | * | 7/2009 | Savinov | 62/617 |

* cited by examiner

*Primary Examiner* — Frank Lawrence, Jr.
(74) *Attorney, Agent, or Firm* — Aleksandr Smushkovich

(57) ABSTRACT

The claimed method and apparatus relate to cryogenic technology, particularly to purifying and separating by distillation a target heavy component concentrate thereby obtaining target components, e.g., krypton and xenon, and isotopes of light gases such as deuterium, tritium, helium-3. The method includes temperature-stabilizing a target heavy component concentrate flow, a low-boiling target component fraction flow, and a high-boiling target component fraction flow, irradiating the flows with ionizing radiation thereby obtaining light gas isotopes, purifying the flows, concentrating the light gas isotopes in the flows with subsequently extracting thereof, purifying the production flows from nuclides, using xenon as the high-boiling target component of the concentrate and using krypton as the low-boiling target component of the concentrate. The claimed apparatus can be used for implementing the method. The method and apparatus allow for increasing the purity and safety of the production heavy target components, as well as for increasing the economic efficiency.

5 Claims, 2 Drawing Sheets

METHOD AND APPARATUS FOR PURIFYING AND SEPARATING A HEAVY COMPONENT CONCENTRATE ALONG WITH OBTAINING LIGHT GAS ISOTOPES

REFERENCES TO RELATED APPLICATIONS

This patent application is a US National Phase of PCT-RU2007-000139 based on a Russian Federation patent application RU2006128430, hereby entirely incorporated by reference.

FIELD OF THE INVENTION

The invention relates to the cryogenic technology, and particularly to methods for purifying and separating a target heavy component concentrate thereby obtaining components of the concentrate, and light gas isotopes, and it could be used in the chemical, petrochemical, and nuclear industries, as well as in medicine.

BACKGROUND OF THE INVENTIVE METHOD

There is known a method for purifying and separating a target heavy component concentrate thereby obtaining components of the concentrate and light gas isotopes, which method including the steps of: supplying and separating a flow of the target heavy component concentrate within a preparatory distillation column thereby forming a low-boiling target component fraction flow and a high-boiling target component fraction flow; supplying and separating the low-boiling target component fraction flow within an additional low-boiling target component column thereby forming a purified low-boiling target component fraction flow and an intermediate admixture flow; supplying and separating the purified low-boiling target component fraction flow within a production low-boiling target component column thereby forming a production low-boiling target component flow and a stripping gas flow from the production low-boiling target component column; supplying and separating the high-boiling target component fraction flow within an additional high-boiling target component column thereby forming a purified high-boiling target component fraction flow and a high-boiling admixture flow; supplying and separating the purified high-boiling target component fraction flow within a production high-boiling target component column thereby forming a production high-boiling target component flow and a stripping gas flow from the production high-boiling target component column; supplying and separating the stripping gas flow from the production low-boiling target component column within an extraction low-boiling target component column thereby forming a low-boiling admixture flow and an extracted low-boiling target component flow; supplying and separating the extracted low-boiling target component flow and the stripped gas flow from the production high-boiling target component column within the preparatory distillation column (RU 2213609, 2003).

The disadvantages of the above-referenced method are: low economical efficiency, and the impossibility for obtaining production heavy target components having admixtures less than $50 \times 10^{-9}$ mole fractions, in which case the substances limiting the purity of the heavy target components are light gas isotopes, essentially helium and hydrogen, and the production heavy target components comprise radioactive nuclides, which restricts applicability thereof, e.g., for medical and household purposes.

BRIEF DESCRIPTION OF THE INVENTIVE METHOD

The primary object of the invention is the increase of purity and the safety of use of the production heavy target components, as well as increasing economical efficiency by obtaining additional products of separation in the form of isotopes of light gases.

This object is achieved by providing a method for purifying and separating a target heavy component concentrate thereby obtaining components of the concentrate and light gas isotopes.

In a preferred embodiment, the inventive method comprises the steps of: supplying and separating a target heavy component concentrate flow within a preparatory distillation (i.e. preliminary rectification) column thereby forming a low-boiling target component fraction flow and a high-boiling target component fraction flow; supplying and separating the low-boiling target component fraction flow within an additional low-boiling target component column thereby forming a purified low-boiling target component fraction flow and an intermediate admixture flow; supplying and separating the purified low-boiling target component fraction flow within a production low-boiling target component column thereby forming a production low-boiling target component flow and a stripping gas flow from the production low-boiling target component column; supplying and separating the high-boiling target component fraction flow within an additional high-boiling target component column thereby forming a purified high-boiling target component fraction flow and a high-boiling admixture flow; supplying and separating the purified high-boiling target component fraction flow within a production high-boiling target component column thereby forming a production high-boiling target component flow and a stripping gas flow from the production high-boiling target component column; supplying and separating the stripping gas flow from the production low-boiling target component column within an extraction low-boiling target component column thereby forming a low-boiling admixture flow and an extracted low-boiling target component flow; supplying and separating the extracted low-boiling target component flow and the stripped gas flow from the production high-boiling target component column within the preparatory distillation column; wherein the improvement is characterized in performing the additional steps of: temperature-stabilizing a) the target heavy component concentrate flow, b) the low-boiling target component fraction flow, and c) the high-boiling target component fraction flow, prior to supplying thereof to the respective columns; irradiating the (a), (b), and (c) flows with ionizing radiation thereby obtaining light gas isotopes and heavy nuclides in the flows; purifying the flows in additional purification units; concentrating the heavy nuclides by distillation in the high-boiling admixture flow, in the intermediate admixture flow, and in the low-boiling admixture flow; concentrating additionally the light gas isotopes by distillation in the stripping gas flow from the production low-boiling target component column, in the stripping gas flow from the production high-boiling target component column, and in the low-boiling admixture flow, while purifying simultaneously the production low-boiling target component flow and the production high-boiling target component flow by distillation; obtaining light gases isotopes from the stripping gas flow of the production low-boiling target component column, from the stripping gas flow of the production high-boiling target component column, and from the low-boiling admixtures flow; wherein the heavy target component concentrate being used preferably consists of one heavy target component, the high-boiling target component is preferably xenon, and the low-boiling target component is preferably krypton.

BACKGROUND OF THE INVENTIVE APPARATUS

There is known an apparatus for purifying and separating a target heavy component concentrate thereby obtaining components of the concentrate and light gas isotopes, which apparatus comprises a target heavy component concentrate flow line supplying its flow into a preparatory distillation column; an additional low-boiling target component column with an intermediate admixture flow line coupled to the preparatory distillation column by a low-boiling target component flow line; an additional high-boiling target component column with a high-boiling admixture flow line coupled to the preparatory distillation column by a high-boiling target component flow line; a production low-boiling target component column connected to the additional low-boiling target component column by a purified low-boiling target component fraction flow line; a production high-boiling target component column with a stripping gas flow line from the production high-boiling target component column connected to the additional high-boiling target component column by a purified high-boiling target component fraction flow line; an extraction low-boiling target component column with a low-boiling admixture flow line connected to the production low-boiling target component column by a stripping gas flow line from the production low-boiling target component column (RU 2213609, 2003).

The disadvantages of the aforesaid apparatus are low economic efficiency, and the impossibility for obtaining the production heavy target components having the admixtures less than $50 \cdot 10^{-9}$ mole fractions, in which case the substances limiting the purity of the heavy target components are light gas isotopes, essentially helium and hydrogen, and the production heavy target components comprise radioactive nuclides, which restricts applicability thereof, e.g., for the medical and household purposes.

BRIEF DESCRIPTION OF THE INVENTIVE APPARATUS

The primary object of the invention is the increasing of purity and safety of use of the production heavy target components, as well as the increasing of economical efficiency by obtaining additional products of separation in the form of isotopes of light gases.

This object is achieved by providing an apparatus for purifying and separating a target heavy component concentrate thereby obtaining components of the concentrate and light gas isotopes.

In a preferred embodiment, the inventive apparatus comprises: a target heavy component concentrate flow line supplying its flow into a preparatory distillation column; an additional low-boiling target component column with an intermediate admixture flow line connected to the preparatory distillation column by a low-boiling target component flow line; an additional high-boiling target component column with a high-boiling admixture flow line connected to the preparatory distillation column by a high-boiling target component flow line; a production low-boiling target component column connected to the additional low-boiling target component column by a purified low-boiling target component fraction flow line; a production high-boiling target component column with a stripping gas flow line from the production high-boiling target component column connected to the additional high-boiling target component column by a purified high-boiling target component fraction flow line; an extraction low-boiling target component column with a low-boiling admixture flow line connected to the production low-boiling target component column by a stripping gas flow line from the production low-boiling target component column; wherein the improvement is characterized in that the apparatus additionally comprises:

a unit for obtaining light gases isotopes; the target heavy component concentrate flow line, the low-boiling target component fraction flow line, and the high-boiling target component flow line each includes heat exchangers, temperature-stabilizing devices, ionization radiation irradiating cameras, additional purification units being disposed thereon; and wherein the low-boiling target component flow line, the stripping gas flow line from the production low-boiling target component column, and the stripping gas flow line from the production high-boiling target component column being connected to the unit for obtaining light gases isotopes through a blowing-off collecting device and an additional flow line enriched with light gas isotopes having a pressure boosting device installed thereon.

The claimed method for purifying and separating a target heavy component concentrate thereby obtaining components of the concentrate and light gas isotopes can preferably be implemented in the claimed apparatus shown diagrammatically in the drawings appended hereto.

AUTHOR'S ABBREVIATIONS USED IN THE DESCRIPTION

Figure 1:
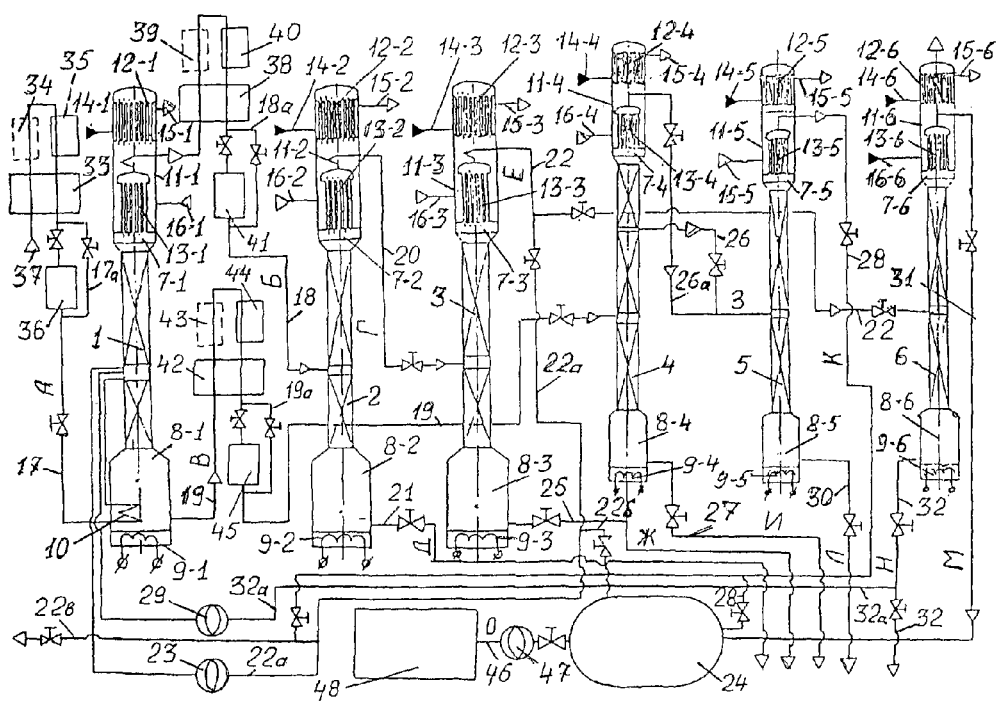
FIG. 1 depicts a schematic view of the claimed device in a preferred embodiment of the present invention.

LBTC—low-boiling target component (e.g., krypton);
HBTC—high-boiling target component (e.g., xenon);
LBTC column—low-boiling target component column;
HBTC column—high-boiling target component column;
HCC flow—heavy component concentrate flow;
LBTC fraction flow—low-boiling target component fraction flow;
HBTC fraction flow—high-boiling target component fraction flow.

DESCRIPTION OF PREFERRED EMBODIMENTS OF THE INVENTION

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

In a preferred embodiment, the inventive apparatus, shown on FIG. 1, comprises a preparatory distillation column 1, an additional LBTC column 2, a production LBTC column 3, an additional HBTC column 4, a production HBTC column 5, and an extraction LBTC column 6. Each of the columns has a condenser-evaporator 7-1 to 7-6 at the head thereof correspondingly, and has stills 8-1 to 8-6 at the bottom thereof correspondingly, provided with an electric heating element 9-1 to 9-6. The still 8-1 further comprises an evaporator 10.

Each of the condensers-evaporators 7-1 to 7-6 has a closed cavity 11-1 to 11-6 being filled with a working medium (operating fluid), wherein the upper portion of the closed cavity surface is capable of heat interaction with a coolant boiling surface 12-1 to 12-6, and the lower portion of that surface is capable of heat interaction with a phlegm vapor condensing surface 13-1 to 13-6.

All the condensers-evaporators are furnished with branch pipes coupled to lines 14-1 to 14-6 supplying liquid coolant and branch pipes coupled to lines 15-1 to 15-6 for deducing coolant vapor. The closed cavities of the condensers-evaporators are furnished with branch pipes coupled to lines 16-1 to 16-6 supplying the operating fluid.

The preparatory distillation column 1 has a branch pipe, located in the center portion thereof, which branch pipe is connected by a HCC flow line 17 (flow A) via the evaporator 10, a purification unit 36, a recuperative heat exchanger 33, an irradiation camera 35 having an ionization radiation source, and thermo-stabilization means, such as a thermostat device 34 with an inlet 37 of the flow A. The purification unit 36 is equipped with a bypass line 17a.

The upper portion of the preparatory distillation column 1 is furnished with a branch pipe connected by a line 18 of an LBTC fraction flow (flow B) through a recuperative heat exchanger 38, a thermostat device 39, an irradiation camera 40 having an ionization radiation source, and a purification unit 41, equipped with a bypass line 18a, with a branch pipe located in the central portion of the additional LBTC column 2.

The still 8-1 of the preparatory distillation column 1 has a branch pipe connected to a branch pipe, located in the center portion of the additional HBTC column 4, via a line 19 of a HBTC fraction flow (flow C) through a recuperative heat exchanger 42, a thermostat device 43, an irradiation camera 44 having an ionization radiation source, and a purification unit 45 equipped with a bypass line 19a.

The additional LBTC column 2 has a branch pipe, located in the upper portion thereof, which branch pipe is connected to a branch pipe, located in the center portion of the production LBTC column 3, via a line 20 of a purified LBTC fraction flow (flow D). In the lower portion (in the still 8-2), the column 2 is furnished with a branch pipe coupled to the apparatus outlet via a line 21 of an intermediate admixture flow (flow A).

The production LBTC column 3 has a branch pipe, located in the upper portion thereof, which branch pipe is connected to a branch pipe located in the center portion of the extraction LBTC column 6, via a stripping gas flow from a line 22 of the production LBTC column (flow F), or connected to a branch pipe, located in the center portion of the preparatory distillation column 1, via a line 22a through a pressure boosting device 23, or connected to a branch pipe of the blowing-off collecting device 24 via a line 22b, or to the apparatus outlet via a line 22c. The still 8-3 has a branch pipe coupled to the apparatus outlet via a line 25 of a production LBTC flow (flow G).

The additional HBTC column 4 has a branch pipe, located in the upper portion thereof, which branch pipe is connected to a branch pipe, located in the center portion of the production HBTC column 5, via a line 26 purified HBTC fraction flow (flow H). In the lower portion (in the still 8-4), the column 4 is furnished with a branch pipe coupled to the apparatus outlet via a line 27 of a low-boiling admixture flow (flow I).

The production HBTC column 5 has a branch pipe, located in the upper portion thereof, which branch pipe is connected to a blowing-off collecting device 24, via a line 28 of a stripping gas flow from the production HBTC column (flow K), or to the line 22a via the line 28a, and further connected to a branch pipe disposed in the center portion of the contact space of the preparatory distillation column 1, via the pressure boosting device 23, or to the apparatus outlet via the line 22c. In the lower portion (the still 8-5), the column 5 is furnished with a branch pipe connected to the apparatus outlet via a line 30 of a production HBTC flow (flow L).

The extraction LBTC column 6 has a branch pipe, located in the upper portion thereof, which branch pipe is connected to the blowing-off collecting device 24, via a stripping gas flow from a line 31 of a production LBTC column (flow M). In the lower portion (in the still 8-6), the column 6 is furnished with a branch pipe coupled to the apparatus outlet via a line 32 of an extracted LBTC flow (flow N), or connected to a branch pipe disposed in the center portion of the contact space of the preparatory distillation column 1, via a pressure boosting device 29, or to the apparatus outlet via a line 32a.

The blowing-off collecting device 24 is connected to a unit 48 for extracting light gas isotopes, via a light gas isotope concentrate line 46 through a pressure boosting device 47.

Figure 2:
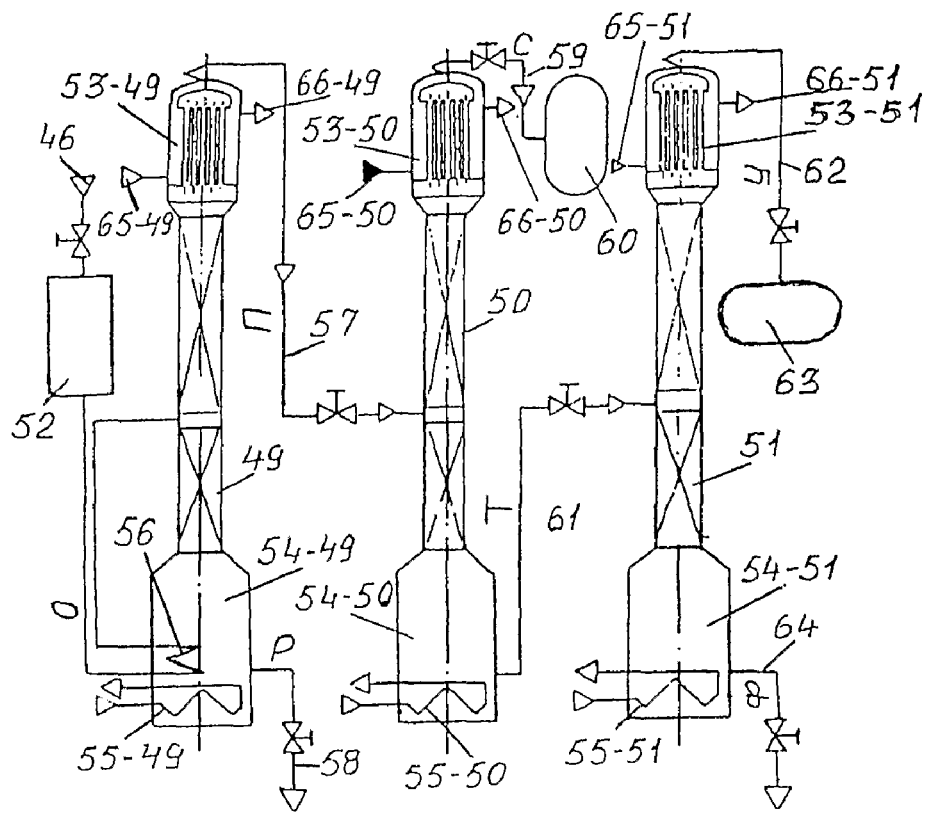
FIG. 2 depicts a schematic view of the unit for obtaining light gas isotopes in a preferred embodiment of the present invention.

The unit 48 (shown on FIG. 2) for extracting light gas isotopes includes: a purifying column 49, a helium isotope extracting column 50, and a hydrogen isotope extracting column 51. Each of those columns is equipped with a condenser-evaporator 53-49 to 53-51, located in the head of the corresponding column. Each condenser-evaporator has a coolant input branch pipe 65-49 to 65-51 and coolant output branch pipe 66-49 to 66-51.

Each of those columns is furnished with a still 54-49 to 54-51, located at the bottom thereof, and each still 54-49 to 54-51 comprises evaporator coils 55-49 to 55-51. The still 54-49 comprises also an evaporator 56.

The purifying column 49 has a branch pipe, located in the upper portion thereof, which branch pipe is connected to the light gas isotope concentrate line 46 through the evaporator 56 and an absorber 52. The column 49 is furnished with a branch pipe connected to a branch pipe, located in the center portion of the helium isotope extracting column 50, via a line 57 of a helium and hydrogen isotope flow (flow P). The still 54-49 has a branch pipe connected to the output of unit 48, via a line 58 of a high-boiling gas flow (flow R).

The helium isotope extracting column 50 has a branch pipe, located in the upper portion thereof, which branch pipe is connected to a helium isotope collector 60, via a line 59 of a production helium isotope flow (flow S). The column still 54-50 has a branch pipe connected to a branch pipe, located in the center portion of the hydrogen isotope extracting column 51, via a line 61 of a hydrogen fraction flow (flow T).

The hydrogen isotope extracting column 51 has a branch pipe, located in the upper portion thereof, which branch pipe is connected a branch pipe, located in the upper portion thereof, which branch pipe is connected to a hydrogen isotope collector 63 via a line 62 of a production hydrogen isotope flow (flow U), and the column still 54-51 has a branch pipe connected to the unit output, via a line 64 neon fraction flow (flow V).

Figure 3:
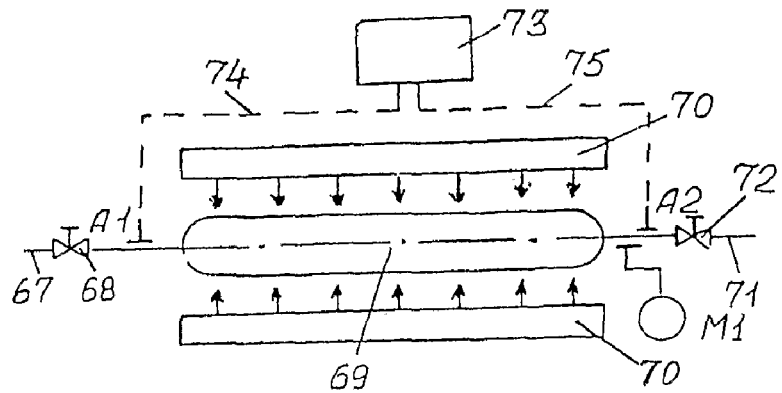
FIG. 3 depicts a schematic view of a research stand.

FIG. 3 illustrates a research stand that includes a research flow supplying line 67 having a valve 68, an irradiation vessel 69 having a manometer M1 and ionization radiation source 70 and coupled to the line 67, and a research flow outputting line 71 having a valve 72. The line 67 is equipped with a sampler (a probe takeoff device) A1. The line 71 is equipped with a sampler A2. The sampler A1 and the sampler A2 are connected respectively, via a line 74 and a line 75, to a device 73, combining a gas chromatograph and mass-spectrometer. An ultra-violet lamp is used as the ionizing radiation source. The irradiation vessel 69 is made from silica glass passing the ultra-violet radiation through.

Sample Operation of the Invention

The inventive method for purifying and separating a target heavy component concentrate thereby obtaining components of the concentrate and the light gas isotope is carried out with the use of the inventive apparatus as follows.

The HTC (heavy target component) concentrate containing, for example, krypton Cr (LBTC), xenon Xe (HBTC) with admixtures of, for example, nitrogen $N_2$, oxygen $O_2$, argon Ar, neon Ne, helium He, hydrogen $H_2$, carbon monoxide CO, carbon dioxide $CO_2$, tetrafluoromethane $CH_4$, hexafluoroethane $C_2F_6$, monofluorotrichloromethane (freon 11) $CFCl_3$, dichlorodifluoromethane (freon 12) $CF_2Cl_2$, radon Rn, radon decomposition products, namely polonium Po isotopes, bismuth Bi isotopes, lead Pb isotopes, etc., is supplied to the HCC flow apparatus inlet 37.

The HCC flow is passed via the recuperative heat exchanger 33, heated (cooled) by the return flow, stabilized the temperature thereof in the temperature-stabilizing device 34, and supplied into the irradiation camera 35 having the ionization radiation source, where the HCC flow is irradiated with the ionization radiation, thus performing the radon isotope decomposition process thereby forming corresponding decomposition products, as well as performing heavy component (e.g., krypton and xenon) isotope decomposition process thereby forming isotopes of light gases (e.g., hydrogen, helium) and heavy nuclides such as isotopes of iodine I, tellurium Te, antimony Sb, tin Sn (in decomposition of xenon Xe, for example), isotopes of bromine Br, selenium Se, arsenic As, germanium Ge (in decomposition of krypton Kr, for example). In such a case, after forming the above isotopes, they could form chemical compounds themselves, particularly with the admixtures presented in the HCC flow (e.g., hydrogen isotopes could form chemical compounds with admixtures of oxygen, carbon monoxide, carbon dioxide, etc.).

Then, the HCC flow is cooled (heated) in the recuperative heat exchanger 33 by the direct flow, forwarded into the purification unit 36, cooled in the evaporator 10, and supplied into the center portion of contact space of the preparatory distillation column 1, where the phlegm is the LBTC (e.g., krypton) condensate and the coolant and working medium in the closed cavity 11-1, condenser-evaporator 7-1 is, for example nitrogen.

As a result of the distillation process, the HBTC (e.g., xenon) fraction containing all high-boiling target component (e.g., xenon) and admixtures high-boiling with regard to the LBTC (e.g., krypton), such as $C_2F_6$, $CFCl_3$, $CF_2Cl_2$, Ra, Po, Bi, Pb, etc., as well as a small, especially supported quantity of the LBTC (e.g., krypton) in amount of 2-5 volume % are collected in the still 8-1, and the LBTC fraction (e.g., krypton) containing the LBTC (e.g., krypton), admixtures volatile with regard thereto including light gas isotopes, as well as $CF_4$ and other admixtures having boiling point close to the LBTC (e.g., krypton) are collected in the column head.

Heavy nuclides being formed while decomposing the heavy target components, such as isotopes if iodine I, tellurium Te, antimony Sb, tin Sn (in decomposition of xenon Xe, for example), isotopes of bromine Br, selenium Se, arsenic As, germanium Ge (in decomposition of krypton Kr, for example), are distributed among the LBTC fraction and HBTC fraction in accordance with the volatility of each component or compound thereof with regard to the HBTC and LBTC.

The LBTC (e.g., krypton) fraction flow is forwarded from the head of the preparatory distillation column 1 via the line 18 to the recuperative heat exchanger 38, where this flow is heated (cooled) by the return flow, stabilized the temperature thereof in the temperature-stabilizing device 39, and supplied into the irradiation camera 40 having the ionization radiation source, where the process for decomposing the LBTC (e.g., krypton) isotopes is additionally carried out thereby obtaining isotopes of light gases and heavy nuclides of the flow, then the flow is cooled (heated) in the recuperative heat exchanger 38 by the direct flow, forwarded into the purification unit 41, and supplied into the center portion of contact space of the additional LBTC column 2, where the phlegm is the LBTC (e.g., krypton) condensate and the coolant in the condenser-evaporator 7-2 and the working medium in the closed cavity 11-2 is, for example nitrogen.

As a result of the distillation process, admixtures less volatile with regard to the LBTC (e.g., krypton) are concentrated in the still 8-2 and are output from the apparatus via the intermediate admixture flow line 21.

The rectified LBTC (e.g., krypton) fraction flow, already not containing low-volatile admixtures relative to the LBTC, is output from the head of the additional LBTC column 2, via the line 20, and forwarded to the center portion of the contact space of the production LBTC column 3, where the phlegm is the LBTC (e.g., krypton) condensate and the coolant in the condenser-evaporator 7-3 and the working medium in the closed cavity 11-3 is, for example nitrogen.

As a result of the distillation process, the production LBTC (e.g., krypton) is collected in the still 8-3 and output from the apparatus via the production LBTC flow line 25, and the stripping gas flow from the production LBTC column (flow F) that contains the LBTC (e.g., krypton) and all components more volatile with regard to the LBTC (e.g., krypton) including also the light gas (hydrogen, helium) isotopes, is output from the head of the production LBTC column 3 via the line 22 and forwarded to the center portion of the contact space of the LBTC (e.g., krypton) extraction column 6.

The phlegm in the column 6 is the condensate from the mixture of low-boiling admixtures (e.g., nitrogen, oxygen, argon, etc.), which condensate is derived while supplying a coolant, for example, nitrogen, directly into the closed cavity 11-6. The stripping gas flow from the production LBTC column (flow F) could be directed, besides the column 6, to the center portion of the contact space of the preparatory distillation column 1 via the lines 22, 22a and the pressure boosting device 23, or to the blowing-off collecting device 24 via the lines 22, 22a and 22b, or could be output from the apparatus via the lines 22, 22a and 22c. As a result of the distillation process, low-boiling admixtures including the isotopes of the light gases (hydrogen, helium) are concentrated in the head of the LBTC extraction column 6 and directed to the blowing-off collecting device 24 via the line 31. The extracted LBTC (e.g., krypton) flow (flow N) is output from the still 8-6 via the line 32 or returned to the center portion of the contact space of the preparatory distillation column 1 via the lines 32, 32a through the pressure boosting device 29.

The HBTC (e.g., xenon) fraction flow (flow C) is forwarded from the still 8-1 of the preparatory distillation column 1 via the line 19 to the recuperative heat exchanger 42, where the flow is heated (cooled) by the return flow, stabilized the temperature thereof in the temperature-stabilizing device 43, and supplied into the irradiation camera 44 having the ionization radiation source, where the process for decomposing the HBTC (e.g., xenon) and LBTC (e.g., krypton) isotopes is additionally carried out thereby obtaining isotopes of light gases and heavy nuclides of the flow, then the flow is cooled (heated) in the recuperative heat exchanger 42 by the direct flow, forwarded into the purification unit 45, and supplied into the center portion of contact space of the additional HBTC column 4, where the phlegm is the LBTC (e.g., krypton) condensate and the coolant in the condenser-evaporator 7-4 and the working medium in the closed cavity 11-4 is, for example nitrogen. As a result of the distillation process, all components less volatile with regard to the HBTC presented in the HBTC fraction flow including $C_2F_6$, $CFCl_3$, $CF_2Cl_2$, Ra, Po, Bi, Pb, etc., as well as heavy nuclides less volatile with regard to the HBTC and compounds thereof formed during the HBTC and LBTC isotope decomposition are concentrated together with the part of the HBTC (e.g., xenon) in the still 8-4 and output from the apparatus via the high-boiling admixture flow line 27.

The purified HBTC (e.g., xenon) fraction flow (flow H) containing, for example, krypton, xenon, and components less volatile with regard to the HBTC (e.g., xenon) including isotopes of the light gases (hydrogen, helium), are forwarded from the upper portion of the contact space of the additional HBTC column 4 via the line 26 to the center portion of the HBTC production column 5, where the phlegm is the HBTC (e.g., xenon) condensate and the coolant in the condenser-evaporator 7-5 and the working medium in the closed cavity 11-5 is, for example nitrogen.

As a result of the distillation process, the production HBTC (e.g., xenon) is collected in the still 8-5 and output from the apparatus, and the stripping gas flow from the HBTC production column (flow K) containing the LBTC (e.g., krypton), trace of the HBTC (e.g., xenon), as well as other components more volatile with regard to the HBTC (e.g., xenon) including the isotopes of the light gases (hydrogen, helium) is output from the head of the HBTC production column 5 via the line 22. The K flow is forwarded to the blowing-off collecting device 24 via the line 28, or to the center portion of the contact space of the preparatory distillation column 1 via the lines 28, 28a, and 22a, or output from the apparatus via the lines 28, 28a, and 22b.

The flows collected in the blowing-off collecting device 24 from the columns 3, 5 and 6 are the concentrate of light gas isotopes containing, besides the hydrogen and helium isotopes, neon, nitrogen, oxygen, argon, and other admixtures. Here, the light gas isotopes are derived from the above flow by physico-chemical techniques, for example, by the distillation technique. For that purpose, the light gas isotope concentrate flow (flow O) is forwarded to the center portion of the contact space of the purifying column 49 via the line 46 through the pressure boosting device 47, absorber 52 (shown on FIG. 2), and evaporator 56, where the phlegm is the condensate of the low-boiling components (hydrogen, neon, helium) and the coolant in the condenser-evaporator 53-49 is, for example helium.

As a result of the distillation process, all admixtures less volatile with regard to the hydrogen are concentrated in the still 54-49 and output from the apparatus via the line 58, and the light gas (hydrogen, helium) isotopes with the admixtures of neon are concentrated in the head of the column and forwarded to the center portion of the contact space of the helium isotope extracting column 50 via the light gas isotope flow line 57, wherein the coolant in the condenser-evaporator 53-5 is, for example, helium.

As a result of the distillation process, helium isotopes are concentrated in the head of the column 50 and output from the apparatus to the helium isotope collector 60 via the production helium isotope flow line 59, and the hydrogen fraction containing neon and hydrogen isotopes is concentrated in the still 54-50 and forwarded to the center portion of the contact space of the hydrogen isotope extracting column 51 via the hydrogen fraction flow line 61, wherein the phlegm is the hydrogen isotope condensate and the coolant is, for example, helium. As a result of the distillation process, hydrogen isotopes are concentrated in the head of this column and output to the hydrogen isotope collector 63 via the production hydrogen isotope flow line 63, and neon is concentrated in the still 54-51 and output from the apparatus via the neon flow line 64.

Experiments of the Authors

The technical solutions described herein are based on experimental data obtained by the authors of the present invention.

When operating the plant in accordance with the scheme of the above prior art, in order for obtaining the production heavy components (experiments were carried out on krypton and xenon) having purity of 99.99999 volume % (respectively, the certification of admixtures in this case was carried out with sensitivity of $(1-5) \cdot 10^{-9}$ molar fraction at the gas chromatograph), the following effect has been found: the production HBTC (in this case, xenon), being derived from the production HBTC column, contained hydrogen at a level of $(50-60) \cdot 10^{-9}$ molar fraction, and at the same time, the hydrocarbon concentration was less than $(10-15) \cdot 10^{-9}$ molar fraction, the concentration of fluorochemicals (such as $CF_4$, $C_2F_6$) was less than $10 \cdot 10^{-9}$ molar fraction, i.e., hydrogen differs markedly against the background of admixtures in the distillation process, notwithstanding that the relative volatility factor for hydrogen with regard to the HBTC (xenon) is higher than, for example, the relative volatility factor for oxygen with regard to the HBTC (xenon), which is ~170. Researches were carried out for determining the distribution of hydrogen with height of the contact portion of the distillation column in the total reflux mode (i.e., without inputting and outputting supply flows and outgoing flows, which corresponds thermodynamically with the maximal separation mode). In such a case, there was found out that hydrogen is distributed along the column (at a level of $(30-50) \cdot 10^{-9}$ molar fraction) rather uniformly, i.e., either the separation process is absent just for the system xenon-hydrogen at this level of hydrogen concentrations, or a constant source of hydrogen background which could be the HBTC itself (in this case—xenon, if a possibility of partial decomposition thereof could be assumed) is present. The fact of absence of the hydrogen content balance between the liquid HBTC, xenon, in the still and the vapor above the still level could serve as a confirmation of this version. In the researches above described, helium of the special purity was used as a carrier gas in the gas chromatograph, therefore helium isotope traces could not be identified.

In order for verifying the HBTC (in this case—xenon) decomposition, the authors have set up a stand shown diagrammatically in FIG. 3. Prior to experiments, the entire system had been degreased, dried with nitrogen flow, and vacuumized. The first series of experiments consisted in the following: the prepared irradiation vessel 69 was filled with pure xenon via the line 67 and the valve 68, blasted via the line 71 through the valve 72 while analyzing through the points A1 and A2 (in so doing, analyses in both those points equal to the analysis of the initial xenon in the balloon were achieved), then the valves 68 and 72 were shut off, and the ionization radiation source 70 (the ultraviolet radiation source was employed) was switched on.

After irradiating the vessel 69 with the ultraviolet radiation, xenon from the vessel 69 was analyzed at the gas chromatograph. The analysis has shown the fact of increasing the hydrogen concentration in xenon from $70 \cdot 10^{-9}$ molar fraction in the initial state up to $600 \cdot 10^{-6}$ molar fraction after irradiating (i.e., the concentration has been increased by factor of more than 8000), as well as increasing the helium concentration from $10 \cdot 10^{-9}$ molar fraction in the initial state up to $30 \cdot 10^{-6}$ molar fraction after irradiating (i.e., the helium concentration has been increased by factor of more than 3000).

When analyzing helium in xenon, argon of special purity with additional purification was used as a carrier gas. After that, the experiment was repeated while duplicating analyses in the points A1 and A2 by the gas chromatograph with an additional analysis at the mass-spectrometer. The mass-spectrometer showed the fact of occurring deuterium, tritium and helium-3 isotopes in xenon after irradiating.

The experiments similar to the above described were carried out with the LBTC (in this case, with krypton), where the effect of occurring deuterium, tritium and helium-3 isotopes after irradiating, but the effect intensity (of course, in the conditions of the carried out experiment) was significantly lower.

The second series of experiments was carried out with the mixture of xenon and $CO_2$. As the initial mixture, a mixture of xenon and $CO_2$ was prepared (the $CO_2$ content was 0.3 molar fraction, total trace content was at the level of $2 \cdot 10^{-6}$, admixtures being certified were $O_2$, $N_2$, Ar, Kr, $H_2$, He, Ne, $C_2F_6$, $CF_4$). The analysis of the content of the radiation vessel 69 after irradiating has shown the fact of occurring in the mixture, besides hydrogen and helium, a variety of hydrocarbons ($CH_4$, $C_2H_6$, $C_3H_8$, etc.), as well as occurring droplets of oily liquid at the vessel walls (presumably, water droplets with dissolved hydrocarbons, the liquid possessed a distinctive smell). Total hydrocarbons in the gaseous phase were up to $1 \cdot 10^{-3}$ molar fraction. This experiment confirms also the fact of forming hydrogen isotopes in the system being irradiated. While repeating the experiment when increasing the temperature of the vessel 69 up to 370° K has resulted in increasing the process intensity.

The authors have drawn the following conclusions based on the results of above-described experiments:

1) An effect of decomposing heavy components, such as xenon and krypton, together with forming light gas isotopes, such as hydrogen (particularly, deuterium and tritium), helium isotopes (particularly, helium-3) has been detected, which effect can be intensified by an external action (particularly, by irradiating with ionization radiation and altering a temperature).

2) The fission products, particularly the hydrogen isotope, tritium, is of serious hazard when employing heavy components such as xenon and krypton in medical and domestic purposes.

3) Hydrogen isotopes reduce applicability of heavy components such as xenon and krypton when employing in rocket technology, electric-bulb-producing industry, medicine, electronic industry, window-producing industry.

4) Forming the isotopes of light gas such as hydrogen and helium could be accompanied with both altering the isotope composition of decomposing components and forming fission fragments, heavy nuclides.

5) In order for increasing the quality, purity and applicability of the products in decomposing the concentrate of heavy target components, for example, xenon and krypton, during production thereof, an additional treatment of respective flows with a subsequent purification by distillation and/or sorption of the decomposition target products is necessary.

6) The additional treatment and purification of the heavy target component flows permit to derive additionally new decomposition products, isotopes of light gases such as deuterium, tritium, helium-3, by extracting thereof from the production hydrogen isotope flow and/or production helium isotope flow by an adsorption technique, and/or gas diffusion technique, and/or centrifugal technique, the new products heaving an independent technical application thereby increasing the economic efficiency of the method for purifying and separating a heavy target component concentrate and the apparatus therefor.

7) It should be noted that the implementation of the claimed method for purifying and separating a target heavy component concentrate thereby obtaining the target concentrate components and light gas isotopes in the claimed apparatus is possible when employing both a mixture of heavy target components as the concentrate and the heavy target component concentrate containing only one heavy target component, for example, the heavy target component concentrate containing one heavy target component, xenon, with admixtures of, for example, krypton Kr, nitrogen $N_2$, oxygen $O_2$, argon Ar, neon Ne, helium He, hydrogen $H_2$, carbon monoxide CO, carbon dioxide $CO_2$, tetrafluoromethane $CH_4$, hexafluoroethane $C_2F_6$, monofluorotrichloromethane (freon 11) $CFCl_3$, dichlorodifluoromethane (freon 12) $CF_2Cl_2$, radon Rn, radon decomposition products, namely polonium Po isotopes, bismuth Bi isotopes, lead Pb isotopes, or the heavy target component concentrate containing only one heavy target component, krypton, with admixtures of, for example, xenon Xe, nitrogen $N_2$, oxygen $O_2$, argon Ar, neon Ne, helium He, hydrogen $H_2$, carbon monoxide CO, carbon dioxide $CO_2$, tetrafluoromethane $CH_4$, hexafluoroethane $C_2F_6$, monofluorotrichloromethane (freon 11) $CFCl_3$, dichlorodifluoromethane (freon 12) $CF_2Cl_2$, radon Rn, radon decomposition products, namely polonium Po isotopes, bismuth Bi isotopes, lead Pb isotopes, etc. In this case, the purpose of processing could be stated as obtaining 16 pure target heavy components and/or obtaining isotopes of light gases as independent products of that processing.

The increasing of purity and safety of use of the production heavy target components, as well as the increasing of the economical efficiency by obtaining additional separation products in the form of isotopes of light gases are achieved by the inventive method for purifying and separating a target heavy component concentrate thereby obtaining the target concentrate's components and the light gas isotopes.

This method comprises the following steps of: supplying and separating a target heavy component concentrate flow within a preparatory distillation column thereby forming a low-boiling target component fraction flow and a high-boiling target component fraction flow; supplying and separating the low-boiling target component fraction flow within an additional low-boiling target component column thereby forming a purified low-boiling target component fraction flow and an intermediate admixture flow; supplying and separating the purified low-boiling target component fraction flow within a production low-boiling target component column thereby forming a production low-boiling target component flow and a stripping gas flow from the production low-boiling target component column; supplying and separating the high-boiling target component fraction flow within an additional high-boiling target component column thereby forming a purified high-boiling target component fraction flow and a high-boiling admixture flow; supplying and separating the purified high-boiling target component fraction flow within a production high-boiling target component column thereby forming a production high-boiling target component flow and a stripping gas flow from the production high-boiling target component column; supplying and separating the stripping gas flow from the production low-boiling target component column within an extraction low-boiling target component column thereby forming a low-boiling admixture flow and an extracted low-boiling target component flow; supplying and separating the extracted low-boiling target component flow and the stripped gas flow from the production high-boiling target component column within the preparatory distillation column, wherein the improvement is characterized in performing the additional steps of: temperature-stabilizing a) the target heavy component concentrate flow, b) the low-boiling target component fraction flow, and c) the high-boiling target component fraction flow, prior to supplying thereof to the respective columns; irradiating the (a), (b), and (c) flows with ionizing radiation thereby obtaining light gas isotopes and heavy nuclides in the flows; purifying the flows in additional purification units; concentrating the heavy nuclides by distillation in the high-boiling admixture flow, in the intermediate admixture flow, and in the low-boiling admixture flow; concentrating additionally the light gas isotopes by distillation in the stripping gas flow from the production low-boiling target component column, in the stripping gas flow from the production high-boiling target component column, and in the low-boiling admixture flow, while purifying simultaneously the production low-boiling target component flow and the production high-boiling target component flow by distillation; obtaining light gases isotopes from the stripping gas flow of the production low-boiling target component column, from the stripping gas flow of the production high-boiling target component column, and from the low-boiling admixtures flow; wherein the heavy target component concentrate being used preferably consists of one heavy target component, the high-boiling target component is preferably xenon, and the low-boiling target component is preferably krypton.

The increasing of the purity and safety of use of the production heavy target components, as well as the increasing of the economical efficiency by obtaining additional separation products in the form of isotopes of light gases are achieved by the inventive apparatus for purifying and separating a target heavy component concentrate thereby obtaining the target concentrate components and light gas isotopes.

This apparatus comprises: a target heavy component concentrate flow line, supplying a preparatory distillation column; an additional low-boiling target component column with an intermediate admixture flow line coupled to the preparatory distillation column by a low-boiling target component flow line; an additional high-boiling target component column with a high-boiling admixture flow line coupled to the preparatory distillation column by a high-boiling target component flow line; a production low-boiling target component column connected to the additional low-boiling target component column by a purified low-boiling target component fraction flow line; a production high-boiling target component column with a stripping gas flow line from the production high-boiling target component column coupled to the additional high-boiling target component column by a purified high-boiling target component fraction flow line; an extraction low-boiling target component column with a low-boiling admixture flow line coupled to the production low-boiling target component column by a stripping gas flow line from the production low-boiling target component column; wherein the improvement is characterized in that the apparatus additionally comprises: a unit for obtaining light gases isotopes; heat exchangers, temperature-stabilizing devices, ionization radiation irradiating cameras, and additional purification units being disposed on the target heavy component concentrate flow line, on the low-boiling target component fraction flow line, and on the high-boiling target component fraction flow line; wherein the low-boiling target component flow line, the stripping gas flow line from the production low-boiling target component column, and the stripping gas flow line of the production high-boiling target component column are being connected to the unit for obtaining light gases isotopes through a blowing-off collecting device and an additional light gas isotopes enriched flow line having a pressure boosting device installed thereon.

The claimed method for purifying and separating a target heavy component concentrate thereby obtaining components of the concentrate and light gas isotopes and the claimed apparatus therefor allow for increasing the purity of the production heavy target components (for example, xenon and krypton), reducing the radioactivity thereof, increasing the safety of use thereof, as well as increasing the economical efficiency by obtaining additional separation products in the form of isotopes of light gases such as deuterium, tritium and helium-3.

The invention claimed is:

1. A method for purifying and separating a target heavy component concentrate thereby obtaining components of said concentrate and light gas isotopes, said method including the steps of:

supplying and separating a target heavy component concentrate flow within a preparatory distillation column thereby forming a low-boiling target component fraction flow and a high-boiling target component fraction flow;

supplying and separating the low-boiling target component fraction flow within an additional low-boiling target component column thereby forming a purified low-boiling target component fraction flow and an intermediate admixture flow;

supplying and separating the purified low-boiling target component fraction flow within a production low-boiling target component column thereby forming a production low-boiling target component flow and a stripping gas flow from the production low-boiling target component column;

supplying and separating the high-boiling target component fraction flow within an additional high-boiling target component column thereby forming a purified high-boiling target component fraction flow and a high-boiling admixture flow;

supplying and separating the purified high-boiling target component fraction flow within a production high-boiling target component column thereby forming a production high-boiling target component flow and a stripping gas flow from the production high-boiling target component column;

supplying and separating the stripping gas flow from the production low-boiling target component column within an extraction low-boiling target component column thereby forming a low-boiling admixture flow and an extracted low-boiling target component flow;

supplying and separating the extracted low-boiling target component flow and the stripped gas flow from the production high-boiling target component column within the preparatory distillation column, characterized in that said method including the additional steps of:

temperature-stabilizing a) the target heavy component concentrate flow, b) the low-boiling target component fraction flow, and c) the high-boiling target component fraction flow, prior to supplying thereof to respective columns;

irradiating said (a), (b), and (c) flows with ionizing radiation thereby obtaining light gas isotopes and heavy nuclides in the flows;

purifying the flows in additional purification units;

concentrating the heavy nuclides by distillation in the high-boiling admixture flow, in the intermediate admixture flow, and in the low-boiling admixture flow;

concentrating additionally the light gas isotopes by distillation in the stripping gas flow from the production low-boiling target component column, in the stripping gas flow from the production high-boiling target component column, and in the low-boiling admixture flow, while purifying simultaneously the production low-boiling target component flow and the production high-boiling target component flow by distillation; and obtaining said light gases isotopes from the stripping gas flow of the production low-boiling target component column, from the stripping gas flow of the production high-boiling target component column, and from the low-boiling admixtures flow.

2. The method according to claim 1, wherein said heavy target component concentrate consists of one heavy target component.

3. The method according to claim 1, wherein said high-boiling target component is xenon, and said low-boiling target component is krypton.

4. An apparatus for purifying and separating a target heavy component concentrate thereby obtaining concentrate components of said concentrate and light gas isotopes, said apparatus comprising:

a target heavy component concentrate flow line supplying a preparatory distillation column with a target heavy component concentrate flow;

an additional low-boiling target component column with an intermediate admixture flow line connected to the preparatory distillation column by a low-boiling target component flow line;

an additional high-boiling target component column with a high-boiling admixture flow line connected to the preparatory distillation column by a high-boiling target component flow line;

a production low-boiling target component column connected to the additional low-boiling target component column by a purified low-boiling target component fraction flow line;

a production high-boiling target component column with a stripping gas flow line from the production high-boiling target component column connected to the additional high-boiling target component column by a purified high-boiling target component fraction flow line;

an extraction low-boiling target component column with a low-boiling admixture flow line connected to the production low-boiling target component column by a stripping gas flow line from the production low-boiling target component column, wherein the improvement is characterized in that the apparatus additionally comprises:

a unit for obtaining light gases isotopes;

the target heavy component concentrate flow line, the low-boiling target component fraction flow line, and the high-boiling target component fraction flow line each includes heat exchangers, temperature-stabilizing devices, ionization radiation irradiating cameras, and additional purification units being disposed thereon; and wherein the low-boiling target component flow line, the stripping gas flow line from the production low-boiling target component column, and the stripping gas flow line from the production high-boiling target component column being connected to said unit for obtaining light gases isotopes through a blowing-off collecting device and an additional flow line enriched with light gas isotopes having a pressure boosting device installed thereon.

5. The method according to claim 2, wherein said high-boiling target component is xenon, and said low-boiling target component is krypton.

* * * * *